United States Patent [19]
Palermo et al.

[11] Patent Number: 5,771,438
[45] Date of Patent: Jun. 23, 1998

[54] SHORT-RANGE MAGNETIC COMMUNICATION SYSTEM

[75] Inventors: Vincent Palermo, Westford; Patrick J. Cobler, Belmont; Neal R. Butler, Acton, all of Mass.

[73] Assignee: Aura Communications, Inc., Wilmington, Mass.

[21] Appl. No.: 824,260

[22] Filed: Mar. 26, 1997

Related U.S. Application Data

[63] Continuation of Ser. No. 444,017, May 18, 1995, abandoned.

[51] Int. Cl.$^6$ ...................................................... H04B 5/06
[52] U.S. Cl. ........................... 455/41; 455/11.1; 455/66; 455/101; 455/133; 455/575
[58] Field of Search ........................... 455/41, 11.1, 33.1, 455/54.1, 74, 89, 90, 274, 101, 131, 133, 134, 73, 82, 66; 379/55, 56, 58; 343/742, 867

[56] References Cited

U.S. PATENT DOCUMENTS

| | | |
|---|---|---|
| 3,617,890 | 11/1971 | Kurauchi et al. . |
| 3,898,565 | 8/1975 | Takeuchi et al. . |
| 4,061,972 | 12/1977 | Burgess . |
| 4,117,271 | 9/1978 | Teeter et al. . |
| 4,442,434 | 4/1984 | Baekgaard ............................... 343/701 |
| 4,489,330 | 12/1984 | Marutake et al. ....................... 343/742 |
| 4,513,412 | 4/1985 | Cox ........................................... 370/29 |
| 4,542,532 | 9/1985 | McQuilkin ................................ 455/78 |
| 4,584,707 | 4/1986 | Goldberg et al. ......................... 455/41 |
| 4,600,829 | 7/1986 | Walton ..................................... 235/439 |
| 4,647,722 | 3/1987 | Nishida et al. ............................. 379/63 |
| 4,654,883 | 3/1987 | Iwata ......................................... 455/89 |
| 4,669,109 | 5/1987 | Le Cheviller et al. .................. 379/143 |
| 4,747,158 | 5/1988 | Golberg et al. ............................ 455/11 |
| 4,752,776 | 6/1988 | Katzenstein ........................ 340/825.44 |
| 4,918,737 | 4/1990 | Luethi ..................................... 381/68.4 |
| 4,967,695 | 11/1990 | Giunta ....................................... 119/29 |
| 5,054,112 | 10/1991 | Ike ........................................... 455/41 |
| 5,276,686 | 1/1994 | Ito .......................................... 370/95.1 |
| 5,276,920 | 1/1994 | Kuisma .................................... 455/101 |
| 5,390,357 | 2/1995 | Nobusawa et al. ...................... 455/134 |
| 5,437,057 | 7/1995 | Richley et al. ........................... 455/41 |
| 5,553,312 | 9/1996 | Gattey et al. .......................... 455/11.1 |

FOREIGN PATENT DOCUMENTS

| | | |
|---|---|---|
| 2431227 | 7/1978 | France . |
| 78/20886 | 7/1978 | France . |
| 2431227 | 2/1980 | France . |
| 3603098 | 1/1987 | Germany ................................ 455/41 |
| 3603098 A1 | 1/1987 | Germany . |
| 36 03 098 A1 | 2/1988 | Germany . |
| 9309032 U | 11/1994 | Germany . |
| 93 09 032 | 12/1994 | Germany . |
| 36 03 098 A1 | 1/1997 | Germany . |

(List continued on next page.)

OTHER PUBLICATIONS

International Search Report, PCT/US96/07144, Sep. 20, 1996, 7 pp.
Plantronics advertisement, Santa Cruz, CA, 1994, 1 page.
Jabra advertisement, San Diego, CA, 1994, 1 page.
Fujitsu advertisement, Reader Service No. 14, 1 page.
Hello Direct advertisement, 1 page.
PCT, Apr. 11, 1996, Phonic Ear Inc.

*Primary Examiner*—Reinhard J. Eisenzopf
*Assistant Examiner*—Lee Nguyen
*Attorney, Agent, or Firm*—Testa, Hurwitz & Thibeault, LLP

[57] ABSTRACT

A system and method communicate signals between a portable unit and a communications system. The portable device communicates with a base unit using inductive coupling. The base unit is further connected to a wider communication system such as a telephone network. Multiple, orthogonally arranged transducers are used in the base unit to provide a more complete magnetic field and to prevent mutual inductance nulls which are otherwise present in a magnetic field. The use of short-range inductive coupling minimizes the power requirements and limits interference with other sources. The inductive coupling may also be used to recharge a battery in the portable device.

9 Claims, 3 Drawing Sheets

FOREIGN PATENT DOCUMENTS

| | | |
|---|---|---|
| 1164281 | 9/1966 | United Kingdom . |
| 1164281 | 9/1969 | United Kingdom . |
| 2197160 | 9/1987 | United Kingdom . |
| 2197160 | 5/1988 | United Kingdom . |
| 2277422 | 10/1994 | United Kingdom . |
| 96/37052 | 11/1996 | WIPO . |

SHORT-RANGE MAGNETIC COMMUNICATION SYSTEM

This is a continuation of application Ser. No. 08/444,017 filed on May 18, 1995 abandoned.

BACKGROUND OF THE INVENTION

1. Field of the Invention

The present invention relates to short-range wireless communication systems, and more particularly to systems utilizing inductive coupling.

2. Discussion of the Related Art

When using a telephone, continually holding the handset to one's ear can be awkward. Also, holding the telephone interferes with the use of both hands for other work while trying to talk. In particular, the use of cellular telephones, which has increased dramatically, can interfere with the user's proper operation of an automobile. Various techniques have been used to overcome these difficulties.

Speakerphones allow one to talk while roaming around a room and using one's hands. However, speaker volume can disturb others around the user. They also cannot be used in close proximity to other speakerphones due to interference. They have limited privacy since the speaker broadcasts the conversation to all within earshot. Typically, the user must speak more loudly than normal to have proper reception at the microphone. Also, they tend to have poor sound quality because the user is not near the microphone and acoustics in the room are poor.

Headsets have been another way to free up the hands of a telephone user. Typically, the headset includes an adjustable strap extending across the user's head to hold the headset in place, at least one headphone located by the user's ear, and a microphone which extends from the headset along and around the user's face to be positioned in front of the user's mouth. The headset is attached by a wire to the telephone. Headsets have the disadvantages of being bulky and somewhat awkward to use. Although they permit hands free use of the telephone, the user has limited mobility due to the connecting wire.

Wireless headsets have also been developed which eliminate the connecting wire to the telephone. The wireless headset uses radio frequency (RF) technology or infrared technology for communicating between the headset and a base unit connected to the telephone. The need for communications circuitry and sufficient power to communicate with the base unit increases the bulk and weight of the headset. This increased weight can become tiresome for the user. One alternative has been to attach the headset by a wire to a transmitting unit worn on the belt of the user. As with wired headsets, the wire can become inconvenient and interfere with other actions by the user. Significant interference rejection circuitry is also needed when multiple wireless headsets are used in close proximity.

Therefore, a wireless communication system for telephones is desired with will provide greater convenience and comfort for the user.

SUMMARY OF THE INVENTION

The deficiencies of prior art systems are overcome by the present invention which, in one aspect, includes a short-range, wireless communication system including a miniaturized portable transceiver and a base unit transceiver. The miniaturized portable transceiver sends and receives information through magnetic induction to the base unit, which may also be portable. Similarly, the base unit sends and receives information through magnetic induction to the portable transceiver. The information can be voice, data, music, or video. Use of magnetic induction fields reduces the power requirements and thus allows a smaller size and greater convenience.

In another aspect of the present invention, the base unit may include multiple, orthogonally arranged transducers for generating multiple magnetic fields. The multiple fields substantially eliminates mutual inductance nulls between the base unit and portable unit which result at certain positions in a generated field. In another aspect of the present invention, the multiple transducers may be selectively operated based upon a strongest signal, in order to limit power consumption.

In another aspect of the present invention, a headset contains the miniaturized transceiver which communicates with the base unit through magnetic induction fields. The information sent between the headset and the base unit may be voice or data. In another aspect of the present invention, the headset may be of the concha type in which the speaker fits into the user's ear without a strap across the head and the transceiving transducer is encapsulated into the microphone boom which is short and straight along the user's cheek. In another aspect of the invention, the base unit may be a portable telephone, which can be attached to the user, to further transmit communications from the wireless communication system to a cellular telephone network or a cordless telephone unit.

In another aspect of the invention, the headset may fit in a receptacle in the portable base unit in order to recharge the battery in the headset. In another aspect of the invention, the battery may be recharged via the magnetic inductive link between the base unit and the headset.

With these and other objects, advantages and features of the invention that may become apparent, the nature of the invention may be more clearly understood by reference to the following detailed description of the invention, the appended claims and the several drawings attached hereto.

DETAILED DESCRIPTION

Figure 1:
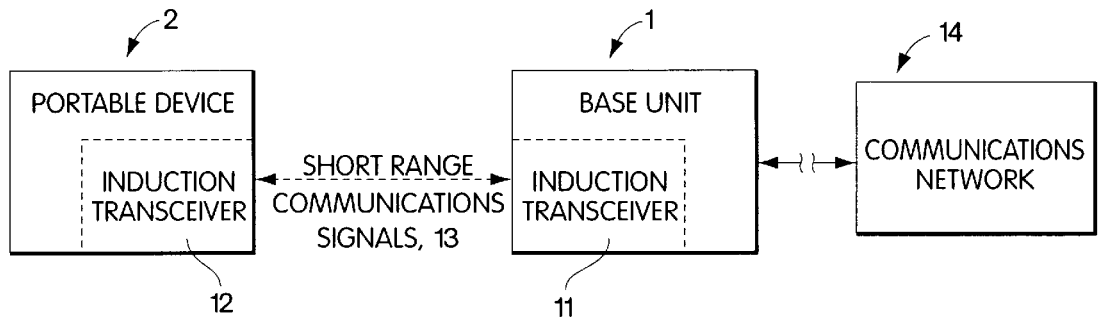
FIG. 1 illustrates schematically the wireless communication system of the present invention.

FIG. 1 illustrates schematically a short-range magnetic communication system 1 including a portable device 2 and a base unit 1, which connects to a long-range communication network 14. Contained within each of the base unit 1 and the portable device 2 is a short-range miniaturized magnetic induction transceiver 11, 12, which can simultaneously transmit and receive communications signals 13. These signals may be voice, audio, data, or video. The communications network 14 may be any network in which it would be desirable for these signals to be communicated over a terminal link without wires, such as a telephone network, personal communications (PCS) network, special mobile radio (SMR) network, computer system or network, and video conferencing systems. The base unit 1 may any part of the communications network 14 from which it would be desirable to communicate to another device without wires; for example, it may be a telephone handset, PCS handset, SMR handset, walkie-talkie, computer or computer peripheral devices, personal digital assistant (PDA), or video game controller. The portable device 2 may be any device from which it would be desirable to communicate without wires to a communications network; for example, it may be a telephone headset or handset, portable computer or computer peripheral device, headphone, or video input device.

Figure 2:
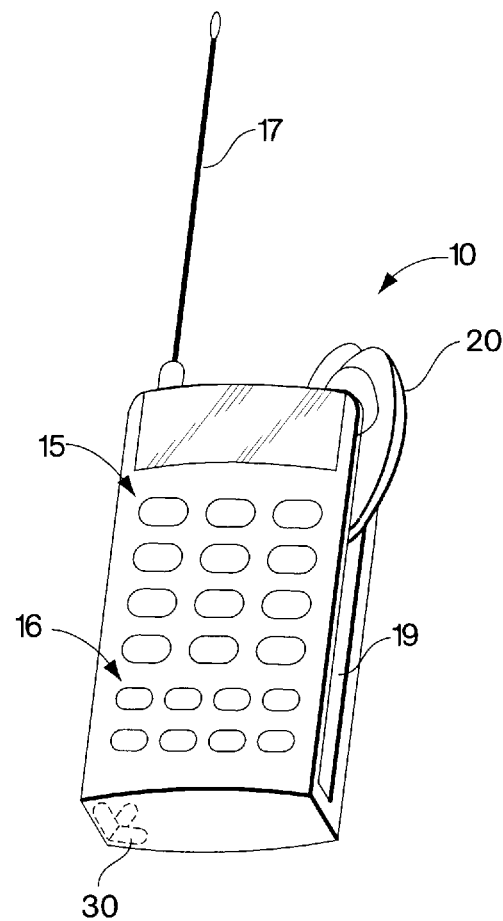
FIG. 2 illustrates a telephone handset as the base unit in the communication system of FIG. 1.

As illustrated in FIG. 2, one example of the base unit 1 is a portable telephone 10 having a plurality of number buttons 15 and a plurality of function buttons 16. A retractable antenna 17 communicates with a cellular telephone network or a cordless telephone base unit. The portable telephone 10 operates in a manner similar to that of an ordinary cellular or cordless telephone handset. Signals are sent to and received from the telephone network in an ordinary manner. The portable telephone 10 includes a transducer system 30 which communicates by magnetic induction with headset 20, which operates as the portable device 2, to provide the outputs and inputs to the portable telephone 10. The portable telephone 10 may also include a mouthpiece or earpiece (not shown) as in a regular telephone handset, allowing the user to choose between a conventional method of operation and a hands-free use afforded by the headset 20.

Figure 3:
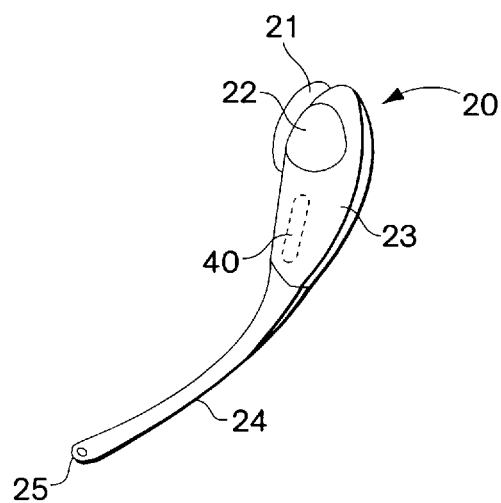
FIG. 3 illustrates a headset that is utilized as the portable device in the communication system of FIG. 1.

The portable device 2 as a headset 20 is illustrated more fully in FIG. 3. It includes a body portion 23 which houses a transducer 40 and processing circuitry. A speaker 22 is connected to the circuitry within the body 23. An earpiece 21 next to the speaker 22 fits in the user's ear to hold the unit in place and to allow the user to hear sounds from the speaker. A microphone boom 24 extends from the body 23 several inches in order to place a microphone 25, located at the end of the boom 24, close to the user's mouth. Alternatively the transducer 40 may be housed in the boom 24. A rechargeable battery 51 is also housed in the body 23 of the headset 20 to provide power to the headset. Other features may be optionally included in the headset 20, such as switcher or buttons for manually activating different modes. For example, a capacitive switch or push-button could be used to cause the headset 20 to transmit a control signal to the portable phone 10 to activate muting of the microphone. The portable phone 10 may include a receptacle 19 for receiving and holding the headset 20. Depositing the headset in the receptacle can provide a variety of functions, in addition to maintaining the headset 20 and portable phone, 10 together. A switch can be disposed in the receptacle to terminate the telecommunication when the headset 20 is inserted or initiate the telecommunication when it is removed. The receptacle may also include connections to recharge the battery 51 in the headset 20.

The base unit 1 and portable device 2 communicate through amplitude modulation of inductive fields, although other modulation methods such as frequency or phase modulation could be employed. During use, the distance between the portable device 2 and the base unit 1 typically is short. Since the distance is short, only an inductive field is necessary, and little or no radiation occurs. This limits the operating power, which allows a smaller size and weight for the rechargeable battery 51 and, thus, the portable device 2. Furthermore, it limits interference between systems operating in close proximity. Therefore, interference rejection circuitry may be limited or not necessary in the portable device 2.

Figure 4:
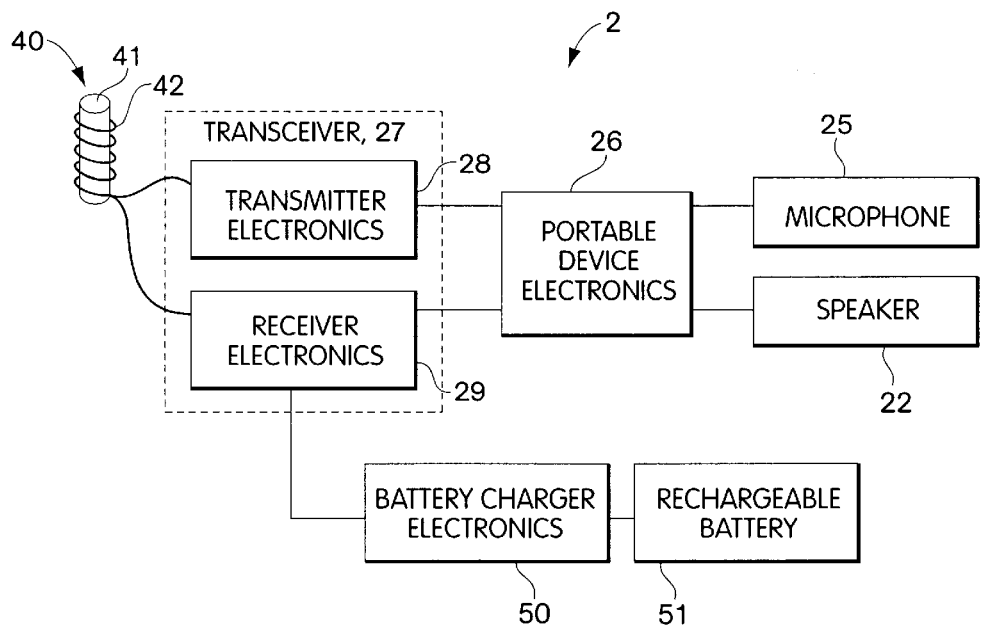
FIG. 4 illustrates schematically the transducer and electronics of the portable device.

The transducer system in the portable device 2 is illustrated schematically in FIG. 4. The transducer 40 preferably includes a ferrite rod transducer having a ferrite rod 41 within a wire coil 42. The wires from the transducer 40 are connected to a transceiver 27 having transmitter electronics 28 and receiver electronics 29. The transceiver 27 connects to the portable device electronics 26, the nature of which is dependent upon the function of the portable device 2. In the example of the portable device as a headset 20, the portable device electronics would connect to a speaker 22 and a microphone 25. Transmission and reception can occur at different frequencies, which permits full duplex operation. Alternatively, separate transmitting and receiving transducers can be used.

Figure 5:
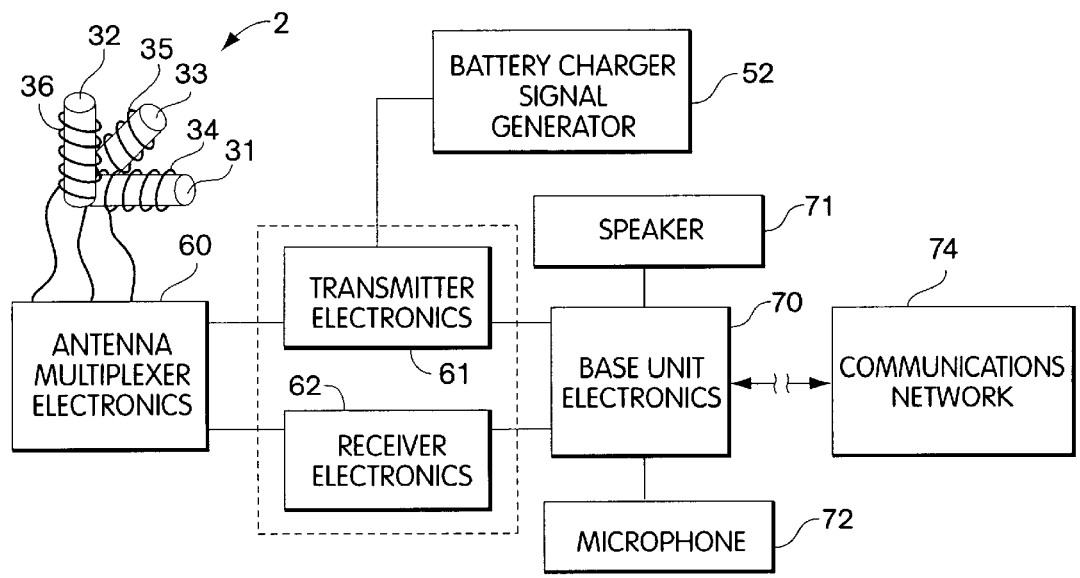
FIG. 5 illustrates schematically the transducer and electronics of the base unit.

The base unit 1 configuration is illustrated schematically in FIG. 5. The transducer system 30 includes three orthogonally disposed ferrite rod transducers, each including a ferrite rod 31, 32, 33 and a respective coil 34, 35 and 36. The use of the orthogonally disposed transducers overcomes the occurrence of mutual inductance nulls in the resulting inductive fields. The three transducers are connected to multiplexer electronics 60 for selecting one or more of the transducers for transmission and reception. Circuitry may be used to select the transducer or transducers having the strongest signal for transmission and reception to reduce the total power consumption of the device. The transmitter electronics 61 and receiver electronics 62 provide for processing of the communications signals from the base unit electronics 70 and the portable device 2. As discussed above, for a portable telephone 10, the conventional telephone speaker 71 and mouthpiece 72 may be eliminated so that the portable telephone 10 solely uses the headset 20 through the transducer system for communicating to the user. Switching circuitry (not shown) would be included to select between the speaker 71 and microphone 72, and the headset 20. The switching circuitry could be included in the receptacle 19 so that the speaker 71 and microphone 72 are disconnected when the headset 20 is removed.

Figure 6:
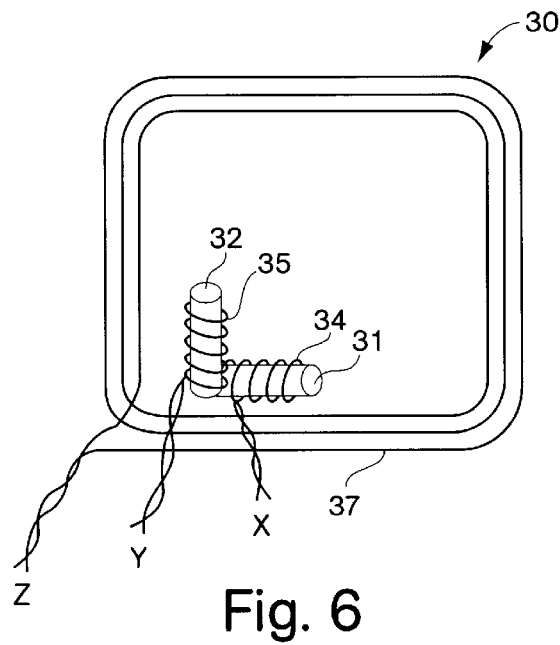
FIG. 6 illustrates an alternative transducer configuration for the base unit.

FIG. 6 illustrates a second embodiment of the transducer system for the base unit 1. In the transducer 30 of FIG. 6, one of the ferrite rod transducers is replaced with a loop coil transducer 37. A loop coil transducer can replace any or all of the ferrite rod transducers. The loop coil transducer 37 is disposed in the plane of the remaining ferrite rod transducers. This creates a transducer system having a decreased depth. As illustrated in FIG. 2, the three orthogonal transducers can be placed in a corner along the sides of the portable telephone 10. Alternatively, the loop coil transducer 37 could be placed along the back of the portable phone 10, so that it could made thinner.

Additionally, the transmission system can be used for charging the battery 51 of the portable device 2. The base unit 1 includes a battery charger signal generator 52 connected to the transmitter 61. This generator 52 produces a recharging signal which is sent through one of the ferrite rod transducers in the base unit 1 to the ferrite rod transducer 40 of the portable device 2. Since in the telephone embodiment of FIG. 2, the headset 20 and transducer 40 have a known orientation when in the receptacle 19, only one transducer in the portable telephone 10 needs to be energized to inductively transmit the recharging signal. As illustrated in FIG. 3, the wires from the transducer 40 in the portable device 2 are connected to a battery charger 50 which is used to charge the battery 51.

Although the communication system of the present invention has been illustrated in connection with a concha type headset 20 and a cellular or cordless telephone handset 10 as a base unit 1, it is readily adaptable for other types of headsets and uses. The headset can be of the over-the-head type, over-the-ear type, or binaural type. The system can be used as a wireless connection to a conventional desktop telephone. Such a system would operate in the manner discussed above with the cordless handset. Since several such units may be used in close proximity, interference may become more of a problem. Therefore, the system can be designed to operate on various frequencies and can select frequencies for the transmission and reception which are unlikely to have significant interference. Similarly, the system can be used with a computer, either stationary or portable, for voice data entry, sound transmission, and telephone functions. The system can also be used with other types of communication systems, including personal digital assistants (PDA's), cordless phones, PCS and SMR cellular phones, two way (video games), two-way half duplex (walkie-talkies, CBs), or two-way full duplex (phones). When the base unit is stationary and the user is likely to be at certain locations relative to the base unit, fewer transducers may be used in the base unit without encountering mutual inductance nulls. Alternative transducer systems may also be used for generating the inductive fields. Specifically, rather than a single transducer for transmission and reception on different frequencies, separate transducers may be used.

Having thus described one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and equivalent thereto.

What is claimed is:

1. A short-range wireless inductive communications system, comprising:

(A) a base unit, including:
     a base unit input for receiving first signals,
     a base unit output for outputting second signals, and
     a base unit transducer system including (i) three orthogonal transducers, (ii) a selector, connected to said input and the three orthogonal transducers, for selectively energizing at least one of the three orthogonal transducers to generate a first inductive field based upon said first signals, and (iii) a receiver, connected to said output and the three orthogonal transducers, for receiving a second inductive field on at least one of the three orthogonal transducers and for converting the second inductive field into said second signals; and (B) a portable unit disposed away from the base unit and within the first inductive field generated by the base unit, the portable unit including:
     a portable unit input for receiving third signals,
     a portable unit output for outputting fourth signals,
     a portable unit transducer consisting of a single transducer, and
     a portable unit transducer system connected to said single transducer, said portable unit input, and said portable unit output, the portable unit transducer system for generating said second inductive field based upon said third signals so that said base unit is within the second inductive field and for receiving said first inductive field via the single transducer and converting said first inductive field into said fourth signals;

wherein the base unit and the portable unit operate so that said first and second inductive fields are concurrently generated and converted, and wherein said selector of said base unit transducer system operates in connection with said single transducer and said portable unit transducer system to select the at least one orthogonal transducer so that the first and second inductive fields are received regardless of relative positions and orientations of the portable unit and the base unit.

2. The communications system of claim 1 wherein said base unit is connected to a communications network which supplies said first signals to said base unit input and which receives said second signals from said base unit output.

3. The communications system of claim 1 wherein the base unit comprises a computer.

4. The communications system of claim 1 wherein said base unit comprises a telephone.

5. The communications system of claim 1 wherein the first inductive field includes a first carrier frequency and the second inductive field includes a second carrier frequency, the first and second carrier frequencies being different.

6. The communications system of claim 1 wherein the selective energization by the selector is performed in a manner which reduces the total power consumption of the short-range wireless inductive communications system.

7. The communications system of claim 2 wherein said communications network comprises a telephone system.

8. The communications system of claim 7 wherein said telephone system comprises a cellular telephone system.

9. The communications system of claim 1 wherein the portable unit comprises a headset, the portable unit input comprises a microphone, and the portable unit output comprises a speaker.

* * * * *